July 31, 1928.

G. TILDEN 1,678,834

PERPETUAL CALENDAR

Filed June 5, 1926

Witness
L. F. Sandberg

Inventor
Galen Tilden
by Baird & Freeman Attorneys

Patented July 31, 1928.

1,678,834

UNITED STATES PATENT OFFICE.

GALEN TILDEN, OF AMES, IOWA.

PERPETUAL CALENDAR.

Application filed June 5, 1926. Serial No. 114,017.

The object of my invention is to provide a perpetual calendar having a number of advantageous features.

More particularly, it is my object to provide such a calendar having thereon means for indicating the first ninety-nine years of four successive centuries, the indicating characters representing the years being arranged in groups to represent years separated by twenty-eight year periods, each of said groups being also arranged for reference to other means for locating the weekly calendars for the respective years.

Another purpose is to provide in such a calendar, groups of characters indicating the monthly calendar for groups of years separated by twenty-eight year periods.

Still another purpose is to provide in such a calendar a series of seven monthly calendars.

Generally speaking, it is my purpose to provide all of this matter so arranged and associated together, as to be particularly convenient for reference, and in that connection I show the material arranged for convenience on discs suitably mounted on a common support.

With these and other objects in view, my invention consists in the construction, arrangement and combination of the various parts of my perpetual calendar, whereby the objects contemplated are attained, as hereinafter more fully set forth, pointed out in my claims, and illustrated in the accompanying drawings, in which:

Figure 1:
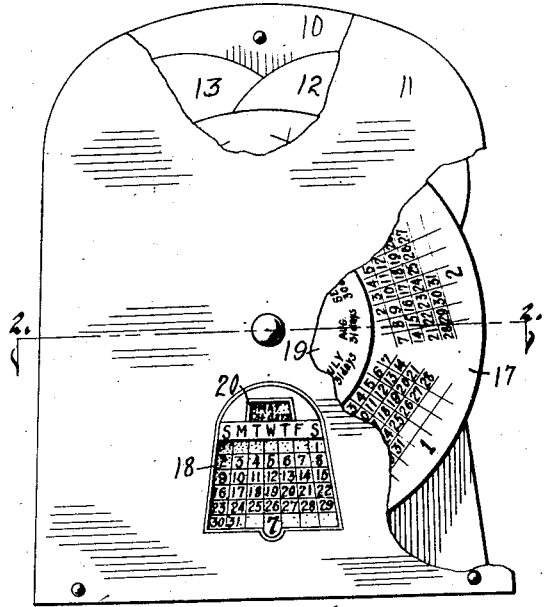
Figure 1 is a rear elevation of a perpetual calendar embodying my invention.
Figure 2:
Figure 2 is a detail, sectional view of the same taken on the line 2—2 of Figure 1.

In the accompanying drawings, I have used the reference numerals 10 and 11 to indicate generally the front and rear members of a casing, which may be connected together in any suitable way for supporting them in relation to permit the discs hereinafter described to be mounted between them.

Figure 4:
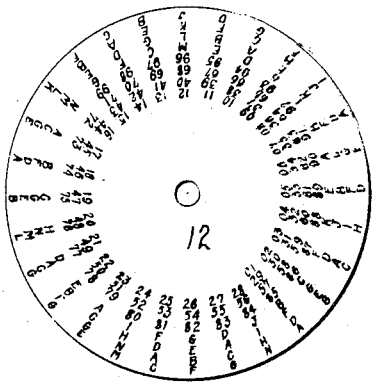
Figure 4 is a plan view of the face of one of the discs.
Figure 5:
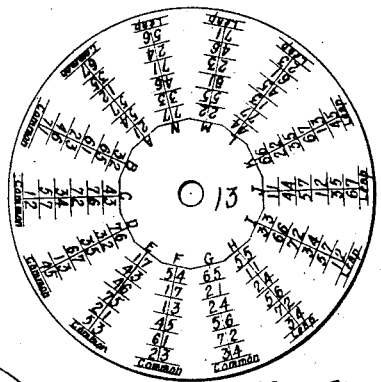
Figure 5 is a plan view of the face of another disc.

In Figure 4, I have shown the face of a disc 12 having arranged thereon, preferably in spiral form, numbers from 1 to 99 representing the first ninety-nine years of a century. The numbers are also arranged in twenty-eighth radial columns or rows.

The numbers in each column represent those years, which are separated by twenty-eight year periods. In line with the respective columns or indicating characters, such as letters of the alphabet. These letters are for the purpose of referring to matter on the disc 13. There are fourteen of such letters, and the disc 13 has fourteen similar indicating characters or letters arranged in a circle as shown.

Arranged in a radial column opposite each of the letters on the disc 13 are double rows of indicating characters, representing monthly calendars.

The discs 12 and 13 are mounted between the members 10 and 11 for rotation.

In the member 10 is a sight opening 14, elongated radially with relation to the disc 12, through which anyone of the radial columns of characters on the disc 12 may be made visible by properly rotating that disc.

Adjacent to the sight opening 14 are indicating characters, such as "For any century—'01 to '99".

Adjacent to the sight opening 14, there are arranged on the member 10, characters 15 for indicating four centuries. The characters "19" for indicating the twentieth century are opposite the innermost circumferential row of letters on the disc 12, the characters "18" opposite the next outer row of letters, and so on.

Figure 3:
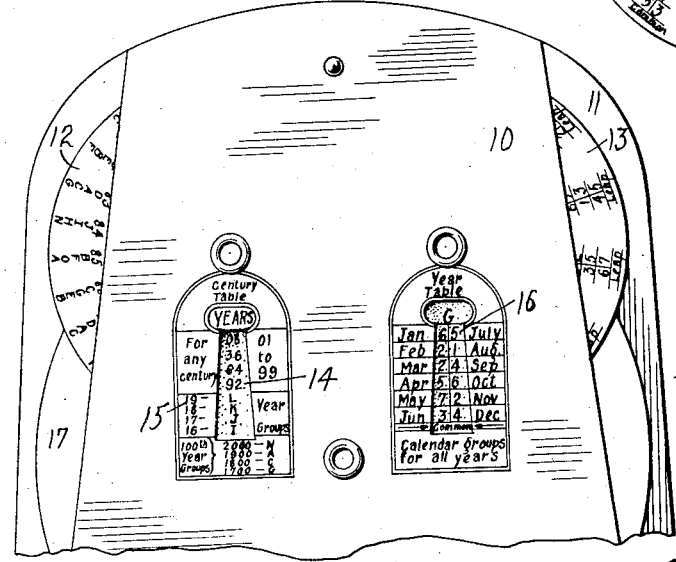
Figure 3 is a front elevation of my calendar.

It thus follows that if the disc 12 be rotated, for bringing any radial column to position where it may be seen through the opening 14, certain numbers will be visible. As shown in Figure 3, these numbers leading from the inside, radially outwardly, are "'08, '36, '64, and '92."

If the user of the calendar desires to find a monthly calendar therefore for any year in the 17th to the 20th centuries, represented by any of those numbers just mentioned, he looks for the letter exposed through the sight opening opposite the number indicating the century under consideration.

For instance, if the year, for which a monthly calendar is desired, is the year 1908, the disc 12 is rotated until the numbers " '08" are exposed through the sight opening 14, and then by following down the sight opening, it will be noted that the monthly calendar is indicated by the letter "L", opposite the number "19" indicating the 20th century.

If it be remembered that the calendar for each successive four hundred years is the same, it will be observed that this is a perpetual calendar.

The monthly calendar for the last year in each century may be found in the following manner:

On the member 10 are characters indicating the years "1700", "1800", "1900", and "2000", and opposite these year indicating characters are letters "G", "C", "A", and "N" representing calendar groups in the same way as do the letters on the disc 12.

The disc 13 is mounted between the members 10 and 11. The member 10 has an elongated sight opening 16 through which any of the radial columns on the disc 13 may be made visible by properly rotating that disc. On the member 10 adjacent the sight opening 16 are indicating characters representing the months of the year and the numbers in the radial columns on the disc 13 are such as represent the appropriate calendar for the month indicated by adjacent characters on the member 10.

Thus, for example, if by the use of the disc 12, it shall have been found that for a certain year the monthly calendar group indicating letter "G" has appeared through the sight opening 14, then the disc 13 is rotated until the letter "G" appears through the sight opening 16, whereupon the number opposite each monthly indicating means on the member 10 adjacent to the sight opening 16 will represent the calendar for such month.

It will be noted that the groups of monthly calendar indicating characters on the disc 13 are arranged in radial columns for common years and leap years.

I provide also a disc 17 having arranged in a radial manner thereon seven monthly calendars for months beginning respectively on the different days of the week.

Following the example referred to in connection with the explanation of the disc 13, if for a given year the monthly calendar indicating letter "G" has been used, then when the disc 13 is rotated until "G" appears through the sight opening 16, it will be found that the month of May for example in the year under consideration is a month represented by calendar No. 7, in which the month begins on the last day of the week, to-wit, Saturday.

The disc 17 may be rotated until the appropriate monthly calendar No. 7 is visible through a sight opening 18 in the member 11. When that calendar is exposed, it will be easy to ascertain upon what day of the week any day of the month fell.

Adjacent to the opening 18 are characters representing the days of the week.

I preferably mount a small disc 19 for rotation between the members 10 and 11. The disc 19 may be mounted concentrically with the disc 17 if desired.

Arranged circumferentially around the disc 19 are characters representing the various months and the number of days in such months. Such a set of characters for any month may be exposed through the sight opening 20 by proper rotation of the disc 19, for thus readily determining the number of days of any month of a year.

It will thus be seen that I have provided a calendar in which the proper characters are associated or related in such manner as to make it convenient for quickly and easily observing the monthly calendar for any month of any year.

I claim as my invention:

1. In a calendar of the character described, a support, a member movably mounted relative to said support and bearing ninety-nine characters successively arranged to indicate ninety-nine years of a century and arranged in rows and columns, each of said columns also including index characters applicable to various units of a quarcentenary group, a second member movably mounted relative to the support and bearing columns of characters indicating monthly calendars, each of the last named columns also including one of the index characters of the first movable member characters on said support indicating a quarcentenary group with which the index characters of the columns of the first movable member may be brought selectively into juxtaposition, a column of characters on said support representing the months of the year with which the columns of the second named movable member may be brought selectively into juxtaposition to designate the appropriate monthly calendar to be used as indicated by the associated index character, and a group of monthly calendars carried by said support and each bearing an index character corresponding to one of the characters carried by the second movable member.

2. In a calendar of the character described, a support, a member movably mounted relative to said support and bearing ninety-nine characters successively arranged to indicate ninety-nine years of a century and arranged in rows and columns, each of said columns also including index characters applicable to various units of a quarcentenary group, a second member movably mounted relative to the support and bearing columns of characters indicating monthly calandars for both leap years and common years, each of the last named columns also including one of the index characters of the first movable member, characters on said support indicating a quarcentenary group with which the index characters of the columns of the first movable member may be brought selectively into juxtaposition, a column of characters on said support representing the months of the year with which the columns of the second named movable member may be brought selectively into juxtaposition to designate the appropriate monthly calendar to be used as indicated by the associated index character, and a plurality of monthly calendars for both leap years and common years carried by said support and each bearing an index character corresponding to one of the characters carried by the second movable member.

3. In a calendar of the character described, a support, a member movably mounted relative to said support and bearing ninety-nine characters successively arranged to indicate ninety-nine years of a century and arranged in rows and columns, each of said columns also including index characters applicable to various units of a quarcentenary group, a second member movably mounted relative to the support and bearing columns of characters indicating monthly calendars, each of the last named columns also including one of the index characters of the first movable member, characters on said support indicating a quarcentenary group with which the index characters of the columns of the first movable member may be brought selectively into juxtaposition, index characters on said support indicating the one hundredth year of each century of the group, a column of characters on said support representing the months of the year and with which the columns of the second named movable member may be brought selectively into juxtaposition to designate the appropriate monthly calendar to be used as indicated by the associated index character, and a plurality of monthly calendars carried by said support and each bearing an index character corresponding to one of the characters carried by the second movable member.

4. In a calendar of the character described, a support, a member movably mounted relative to said support and bearing characters arranged in rows and columns to indicate years, each of said columns also including index characters applicable to various units of a group of centuries, a second member movably mounted relative to the support and bearing columns of characters indicating monthly calendars, each of the last named columns also including one of the index characters of the first movable member, characters on said support indicating a century group with which the index characters of the columns of the first movable member may be brought selectively into juxtaposition, a column of characters on said support representing the months of the year with which the columns of the second named movable member may be brought selectively into juxtaposition to designate the appropriate monthly calendar to be used as indicated by the associated index character, and a plurality of monthly calendars carried by said support and each bearing an index character corresponding to one of the characters carried by the second movable member.

5. In a calendar of the character described, a support, a member movably mounted relative to said support and having thereon, characters representing years of a century, said yearly characters being arranged in rows and columns with the characters of each column twenty-eight years apart, each of said columns also including index characters applicable to various units of a group of centuries, a second member movably mounted relative to the support and having thereon, characters indicating monthly calendars, each of the last named columns also including one of the index characters of the first movable member, characters on said support indicating a plurality of centuries, with which century characters the index characters of the first movable member may be brought selectively into juxtaposition, a column of characters on said support representing the months of the year and with which the columns of the second movable member may be brought selectively into juxtaposition to designate the appropriate monthly calendar to be used as indicated by the associated index character, and a plurality of monthly calendars each bearing an index character corresponding to one of the characters carried by the second movable member.

Des Moines, Iowa, June 1, 1926.

GALEN TILDEN.